(12) United States Patent
Keller (10) Patent No.: US 6,191,185 B1
(45) Date of Patent: *Feb. 20, 2001

(54) UV CURABLE INK CONTAINING ALUMINUM TRIHYDROXIDE FOR USE IN PAD PRINTING, AND METHOD OF PRINTING

(75) Inventor: Viktor Keller, Colchester, CT (US)

(73) Assignee: Spalding Sports Worldwide, Inc., Chicopee, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/233,614

(22) Filed: Jan. 19, 1999

Related U.S. Application Data (60) Division of application No. 08/877,938, filed on Jun. 18, 1997, now Pat. No. 5,885,173, which is a continuation-in-part of application No. 08/529,361, filed on Sep. 18, 1995, now Pat. No. 5,770,325, which is a continuation-in-part of application No. 08/753,704, filed on Nov. 27, 1996, now Pat. No. 5,827,134.

(51) Int. Cl.[7] ................................ C08F 2/48; C08F 2/50
(52) U.S. Cl. ................................ 522/81; 522/71; 522/74; 522/75; 522/76; 522/78; 522/79; 522/80; 106/31.6
(58) Field of Search ................................ 522/81, 71, 74, 522/75, 77, 76, 78, 80; 106/31.6

(56) References Cited

U.S. PATENT DOCUMENTS

| 3,661,614 | * | 5/1972 | Bassemir et al. ................ 117/38 |
| 4,125,678 | * | 11/1978 | Stvan et al. ................ 428/514 |
| 4,751,102 | * | 6/1988 | Adiar et al. ................ 427/53.1 |
| 5,091,505 | | 2/1992 | Serafini et al. . |
| 5,268,487 | | 12/1993 | Yang et al. . |
| 5,322,924 | | 6/1994 | Chuang et al. . |
| 5,344,986 | | 9/1994 | Oren et al. . |

OTHER PUBLICATIONS

Richard J. Lewis, Sr. Hawley's Condensed Chemical Dictionary. 13th ed., 1997.*
N.R. Dando et al. Journal of Coating Technology, vol. 68, No. 859, Aug. 1996, pp 67–72.*

* cited by examiner

Primary Examiner—James J. Seidleck
Assistant Examiner—Sanza L. McClendon (57) ABSTRACT

Disclosed herein is a game ball, such as a golf ball, having an indicia formed from a UV curable ink containing aluminum trihydroxide (ATH) filler. The ATH improves pad transfer of the ink. An ink composition suitable for pad printing, and a method for applying an indicia to a game ball also are disclosed. The UV curable ink has excellent pad transfer properties, and good durability.

14 Claims, 3 Drawing Sheets

UV CURABLE INK CONTAINING ALUMINUM TRIHYDROXIDE FOR USE IN PAD PRINTING, AND METHOD OF PRINTING

RELATED APPLICATIONS

This is a divisional of U.S. application Ser. No. 08/877,938, filed Jun. 18, 1997, now U.S. Pat. No. 5,885,173, which is a continuation-in-part of U.S. application Ser. No. 08/529,361 filed Sep. 18, 1995, now U.S. Pat. No. 5,770,325. This is also a continuation-in-part of U.S. application Ser. No. 08/753,704 filed Nov. 27, 1996, now U.S. Pat. No. 5,827,134.

BACKGROUND OF THE INVENTION

The present invention generally relates to inks, and more particularly to UV curable inks.

UV curable inks are quick-curing inks and therefore are advantageous for use in continuous-type processes in which subsequent treatment of an ink-printed substrate is involved. A number of UV curable inks are known. For example, U.S. Pat. No. 4,271,258 discloses a photopolymerizable ink composition containing acrylate resin, methacrylate monomer or oligomer, acrylate monomer or oligomer, photoinitiator, and a particular type of an epoxy resin. U.S. Pat. No. 5,391,685 discloses a UV curable ink having an isocyanate compound added thereto. U.S. Pat. No. 5,391,685 contends that the ink disclosed therein is particularly well suited for printing on slightly adhesive plastic bases, such as those made of polyoxymethylenes and polypropylenes.

Screen printing on spherical surfaces such as golf balls can be difficult. As a result, pad printing customarily is used for marking golf ball surfaces. However, many of the known UV curable inks are not well suited for pad printing due to difficulties in transferring the ink from a pad to a substrate. Furthermore, UV curable inks that can be pad printed have not been found suitable for use on golf balls. More specifically, when applied to a golf ball, these inks are not sufficiently durable (impact resistant) to withstand multiple blows by a golf club. It would be useful to obtain a highly durable UV curable ink which has favorable pad transfer properties when used for printing indicia on surfaces such as a curved and dimpled surface of a golf ball, and which provides an image having good durability.

SUMMARY OF THE INVENTION

An object of the invention is to provide a new and improved UV curable ink.

Another object of the invention is to provide a UV curable ink which is particularly well suited for application by pad transfer.

A further object of the invention is to provide a quick curing ink for use on a game ball, such as a golf ball, and on hard surfaces of other sporting goods, thereby enabling more rapid production.

Another object of the invention is to provide a pad printable, UV curable ink having good impact resistance.

Yet another object of the invention is to provide a game ball, such as a golf ball, having a clear and durable ink image printed thereon.

A further object of the invention is to provide a method for pad printing an indicia on a hard surface of a game ball, golf club, bat or racket, the indicia comprising a UV curable ink.

Yet another object of the invention is to provide a method for applying a smudge resistant and durable indicia to a visible surface of a game ball.

Other objects of the invention will be in part obvious and in part pointed out more in detail hereafter.

The invention is a UV curable ink composition. The ink composition comprises a UV curable resin, aluminum trihydroxide in an amount appropriate to provide the ink composition with improved pad transfer, a coloring agent, such as a pigment or dye, and a photoinitiator for initiating polymerization of the UV curable resin. The ink composition forms a cured indicia having adhesive properties and impact resistance which render the cured indicia suitable for use on game balls to be used in competitive play. A thinning agent which includes a monomer and/or solvent also is preferably included. A wetting agent and/or extender pigment also can be added. To facilitate pad transfer, the ink has a viscosity of 1,000–28,000 centipoise, preferably 1,000–4,000 centipoise, and more preferably 1,000–2,000 centipoise at the time of application.

DETAILED DESCRIPTION OF THE INVENTION

The UV curable ink of the present invention is unique in that it exhibits a combination of favorable transfer properties and good durability or impact resistance. The ink can be used for printing indicia on golf balls, softballs, baseballs, other game balls, as well as other sporting goods, including but not limited to softball and baseball bats, tennis and raquetball rackets, and golf clubs. The ink also can be applied to a variety of materials, including but not limited to ionomers, polybutadiene, composite materials, metals, etc.

As indicated above, the ink comprises a UV curable resin, a coloring agent, such as a pigment or dye, aluminum trihydroxide, and a photoinitiator. A thinning agent which includes a monomer and/or a solvent can be added. If necessary, a wetting agent also can be included.

The UV curable resin preferably comprises an oligomer. Non-limiting examples of the oligomer include one or more epoxies, acrylics, acrylated urethanes, elastomeric acrylates, unsaturated polyesters, and polyethers. Specific examples of suitable oligomers include methacrylates such as bisphenol A ethoxylate dimethacrylate and acrylated epoxies. Blends of different oligomers can be used. The oligomer must provide the ink with characteristics of flexibility and impact resistance that are sufficient to withstand the conditions to which the substrate is to be subjected. For example, if the substrate is a golf ball, the oligomer must impart to the ink more flexibility than is inherent in the underlying substrate if optimum durability is desired. When a top coat is to be placed over the ink, the ink should not be so highly cross-linked that adhesion of the top coat to the ink is substantially hindered.

The uncured ink preferably comprises about 10–90 wt % oligomer, more preferably about 20–80 wt % oligomer, and most preferably about 50–70 wt % oligomer.

The coloring agent can be any type of pigment, dye or the like which will withstand UV treatment, i.e., which is not UV labile. Furthermore, the coloring agent should permit sufficient passage of UV light through the ink by any combination of transmission, reflection, or refraction mechanisms, to initiate photocrosslinking. Liquids or powders can be used. One preferred form of the ink is a powder which is dispersed in liquid monomer. Carbon black and iron oxide black are non-limiting examples of suitable pigments for making black inks. Red lake and quinacrydones are non-limiting examples of suitable pigments for making red inks. Blends of different pigments and/or dyes can be used. The uncured ink preferably contains about 2–60 wt % pigment, more preferably about 5–30 wt % pigment, and most preferably about 5–10 wt % pigment.

The photoinitiator is selected to respond to the wavelength of UV radiation to be used for photoinitiation. It is also important to consider the color of the ink in selecting the photoinitiator because, as indicated above, it is necessary for the UV light to penetrate the ink composition to initiate the cure. More specifically, penetration is required in order to cure the portion of the ink which is beneath the surface. Penetration typically is most difficult when black or white pigments are used. Non-limiting examples of photoinitiators to be used in conjunction with black pigment include sulfur-type photoinitiators such as isopropyl thioxanthone, and benzophenone and its derivatives including acetophenone types and thioxanthones. Photoactivators can be used in conjunction with one or more photoinitiators. Non-limiting examples of suitable photoactivators are amine-type photoactivators such as ethyl 4-dimethylamino benzoate. The uncured ink preferably contains about 0.3–5 wt % photoinitiator, more preferably about 1–4 wt % photoinitiator, and most preferably about 3–4 wt % photoinitiator. Blends of different photoinitiators, or photoinitiators and photoactivators, can be used.

A thinning agent is added if it is needed to lower the viscosity of the uncured ink composition or to contribute to impact resistance or flexibility. When monomer is used as a thinning agent, it should be a photopolymerizable monomer which forms a polymeric structure upon irradiation. In contrast, when solvents are used as thinning agents, they evaporate during curing. The monomer can be a monofunctional, difunctional or multifunctional acrylate. Non-limiting examples of suitable monomers include 1,6 hexane dioldiacrylate, butane dioldiacrylate, trimethylol propane diacrylate, tripropylene glycol diacrylate and tetraethylene glycol diacrylate.

The uncured ink preferably contains about 10–70 wt % monomer, more preferably about 10–60 wt % monomer, and most preferably about 10–55 wt % monomer. Preferably, the combination of monomer plus oligomer-constitutes about 45–80 wt % of the uncured ink, more preferably about 50–80 wt %, and most preferably about 60–80 wt % of the ink.

Non UV curable quick-drying resins which help in ink transfer from the pad to the ball can be added. Non-limiting examples of such resins are vinyl resins, nitrocellulose, acrylic resins, and other quick-drying, film-forming resins. One preferred resin is an acrylic-OH functional resin made by McWorther, Inc. of Carpentersville, Ill., sold as Resin 975. Typically, if such resins are used, they are added in an amount up to about 30 parts by weight based upon 100 total parts by weight of uncured ink composition.

When a solvent is used, it typically is a liquid with a fast to moderate evaporation rate which, upon partial evaporation causes the ink to be tacky, and thereby promotes transfer onto and off an ink pad. Solvent also can be the medium in which photoinitiator is dissolved. Non limiting examples of suitable solvents include aromatic solvents such as toluene, xylene, and ester types such as butyl acetate. The uncured ink preferably includes about 1–30 wt % solvent, more preferably about 5–20 wt % solvent, and most preferably about 8–10 wt % solvent.

Wetting agents can be added if necessary to prevent beading of the ink upon application to the golf ball. Suitable wetting agents include, but are not limited to, silicon surfactants and fluorocarbon surfactants. The uncured ink preferably includes about 0–2 wt % wetting agent. Other additives that do not adversely affect the pad transfer and impact resistance of the ink also can be incorporated into the ink composition.

Extender pigments such as talc, barium sulfate and the like can be added as long as sufficient durability is maintained. Such materials may be used to improve transferability. Typically, if such materials are used, they constitute about 10–40 wt %, or more preferably 20–30 wt %, of the uncured ink formulation.

It has been found that by replacing part or all of the extender pigments such as talc and barium sulfate with aluminum trihydroxide ($Al_2O_3(H_2O)_3$) (ATH) filler, a number of significant improvements to the UV ink will result with respect to printing, curing and processing. Additionally, the inclusion of ATH will have minimal effect on the color of the ink. Furthermore, ATH has low oil absorption, thus ink viscosity is increased very little. When up to 50 wt % ATH based upon the total (uncured) weight of ink is added, ink transfer from a pad to a substrate is improved. Significantly, ATH does not absorb UV light so curing of the ink is not impeded.

When ATH is used in a UV curable game ball ink, it generally is included in an amount of 10–50 wt % based upon the total weight of the ink prior to curing. Preferably, ATH is employed in an amount of 10–32 wt %, and more preferably 20–30 wt %. It is believed that ATH loadings up to at least 50 wt % based upon the weight of (uncured) ink may be useful for overall balance of properties. Greater quantities of ATH can be used when a low cost ink is desired and durability requirements are not stringent. Lower quantities of ATH are useful when higher durability is needed. The ATH preferably is used in a quantity appropriate to impart to the ink a balance of properties such as pad transfer and durability of the ink. The ATH used may, for example, have a narrow particle size distribution with a median particle size of about 1 micron. However, the medial particle size can be in the range of at least as small as 0.25 micron to at least as large as 50 microns.

If ATH is used in combination with talc, barium sulfite, or the like, the ratio of ATH to talc, etc., is preferably about 1:1.

The use of ATH does not impede the curing process. The surface tension of the ink affects wettability of the substrate. The surface tension of the ink should not be substantially higher than the surface tension of the substrate upon which it is printed. The viscosity of the ink will determine the thickness of the indicia on the cover. If the indicia is too thick, the UV radiation will not penetrate the indicia and complete curing may become difficult. On the other hand, if the indicia is too thin, the durability of the ink layer may be insufficient for conditions of play. The indicia has a thickness of less than 100 microns, preferably about 10–40 microns, more preferably 13–30 microns, and most preferably 20–25 microns.

The cured ink should be sufficiently flexible that it exhibits good impact resistance. It is advantageous for the top coat which is applied over the ink to react with the ink to hold the ink in place, or to have adhesion by hydrogen bonding and/or Van Der Waals forces. As a non-limiting example, the ink can be used in conjunction with a two component polyurethane top coat, such as a top coat based on polyester or acrylic polyols and aliphatic isocyanates such as hexamethylene diisocyanate or isophorone diisocyanate trimers.

It is essential for a top coat to be applied over the indicia to protect the indicia unless the indicia has sufficient adhesion to the surface to which it is applied, e.g., the cover or a primer layer, to render the use of a top coat unnecessary. The adhesion between the ink and the top coat and/or substrate should be sufficiently strong that the indicia remains substantially intact when the game ball is used. Standards for image retention vary depending upon the intended use of the game ball and the degree and frequency of impact that the image is required to withstand. When applied to a golf ball, the ink durability should be sufficient in order that after the ball is subjected to the wet barrel durability test procedure described below, at least 50% of the surface area of the original image remains, more preferably at least 70%, and most preferably at least 80%.

A UV curable ink formulation of the invention which is used for marking golf balls is prepared and used in the following way. The photoinitiator is dissolved in the thinning agent, which is then mixed with oligomer, pigment and aluminum trihydroxide. The mixture is placed in an open or closed cup dispenser of a pad printing device. A primed but unfinished golf ball is obtained. The ball 8, which is shown in finished form in FIG. 1, includes, for example, a core 10, and a durable cover layer 12 having a dimpled surface. Alternatively, the core and cover can be formed in one piece. An indicia 14 formed from the UV curable ink is pad printed over the golf ball cover 12. The ink indicia can either be stamped directly on the cover or can be stamped on a primer coat which is placed over the cover. The unfinished golf ball is then subjected to UV treatment under conditions sufficient to commence curing of the ink. After photoinitiation, curing of the ink is substantially complete within a time period of between less than one second and a few seconds.

Figure 1:
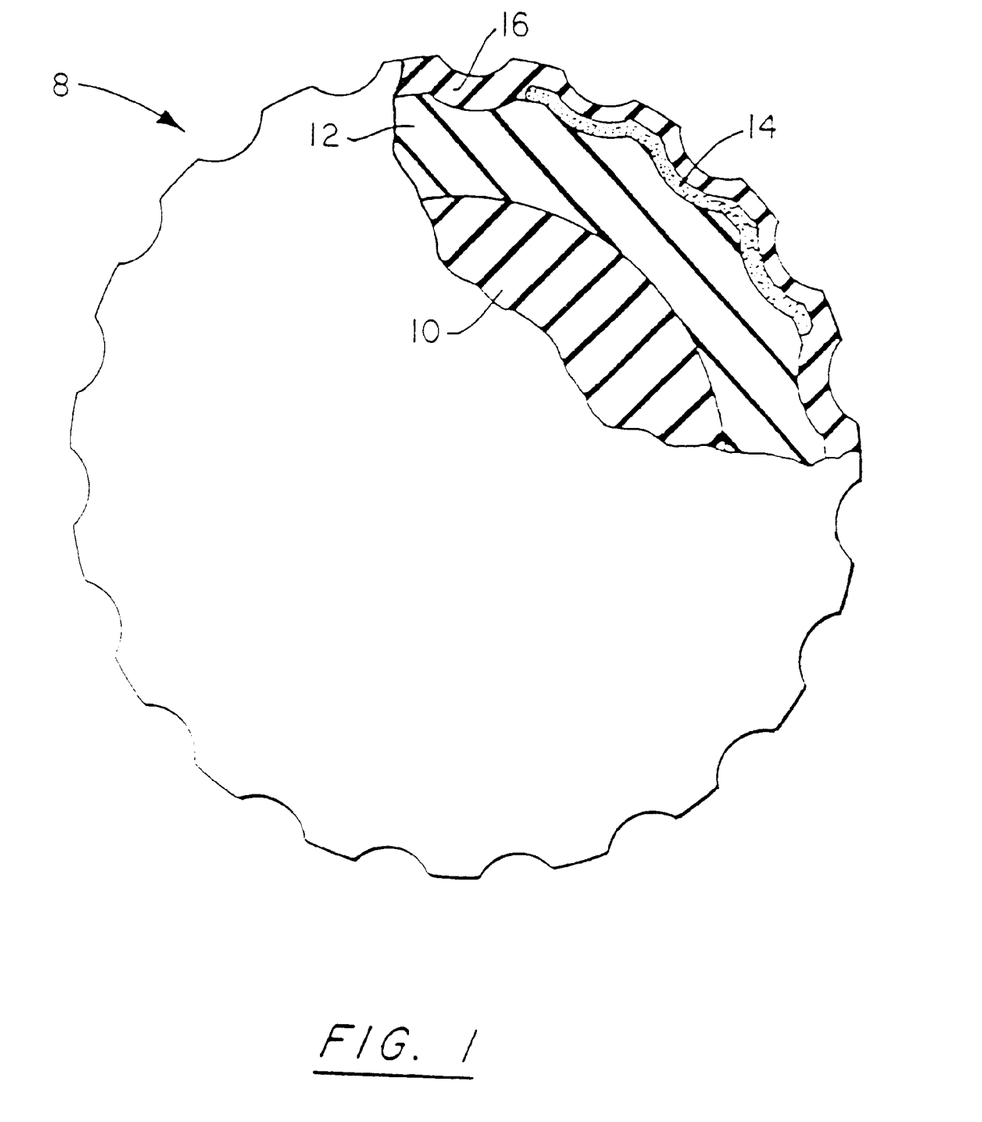
FIG. 1 shows a game ball having an indicia comprising a UV curable ink in accordance with the present invention.

A top coat layer 16 is placed over the ink indicia after the ink is cured. The top coat layer 16 assists in keeping the indicia on the golf ball surface, as indicated above, and therefore the adhesion of indicia to the golf ball does not need to be as strong as would be required if the ink were to constitute the outer layer of the ball. The top coat typically has a thickness of 10–40 microns.

The conditions of UV exposure which are appropriate to cure the ink can be ascertained by one having ordinary skill in the art. For example, it has been found that when a golf ball passes through a UV treatment apparatus at a rate of 10 ft/min. at a distance of about 1¼–1¾ inches from a UV light source which has an intensity of e.g. 200–300 watts/in$^2$, the indicia should be exposed to UV radiation for no more than a few seconds, preferably, no more than about 1 second, and more preferably no more than about 0.7 seconds. Higher and lower UV lamp intensities may be used as long as the cured ink meets the applicable durability requirements. Excess UV exposure is avoided in order to prevent degradation of the substrate. The ink is UV cured prior to application of any top coat.

The pad to be used for transfer of the UV ink preferably contains silicone. This type of pad has good elasticity, durability and softness and an appropriate surface tension. Other types of pads also can be used.

The ink can be applied on a non-UV-labile surface of a game ball. According to the invention, it is generally not necessary to pretreat the surface prior to application of the ink. If it is desired to apply the UV curable ink on an extremely smooth surface upon which transfer is poor, the portion of the surface to be stamped can be chemically or physically etched or abraded in order to provide an ink-receptive surface.

The ink of the invention has a sward hardness (ASTM-D 2134-66) after curing of no more than 55, more preferably no more than 40, and most preferably no more than about 20. The UV curable ink of the invention provides for durability sufficient to meet stringent durability standards required for commercial grade golf balls. The durability of the ink can be determined by testing stamped golf balls in a variety of ways, including using the wet barrel durability test procedure.

Figure 2:
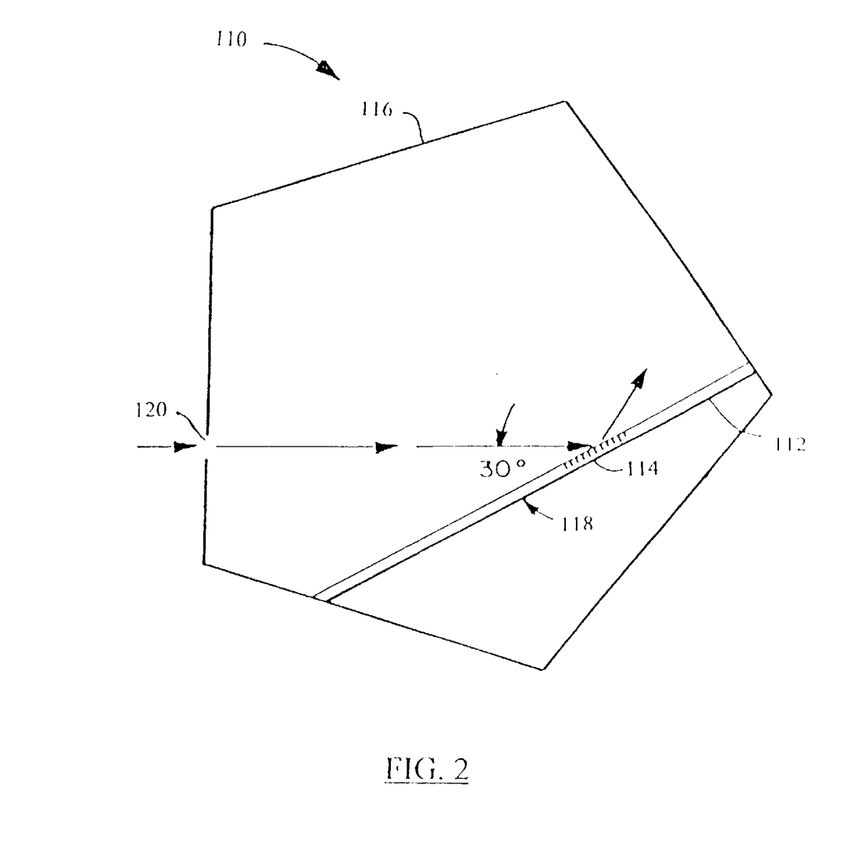
FIG. 2 schematically shows the durability test apparatus to determine the durability of the indicia of the invention on a golf ball.
Figure 3:
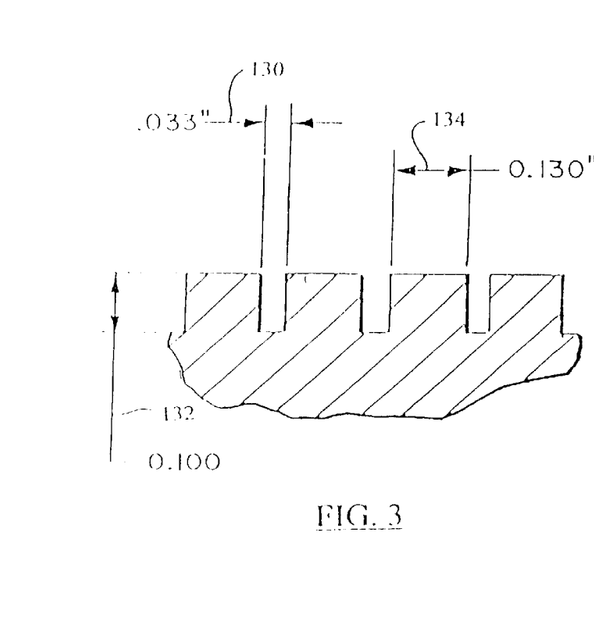
FIG. 3 is a partial side view of a portion of an insert plate in the durability test apparatus which has grooves intended to simulate a golf club face.
Figure 4A:
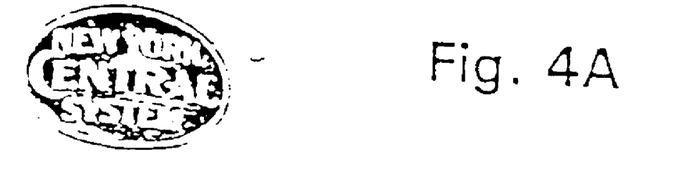
FIG. 4 shows the differences in pad transfer of four UV curable inks.
Figure 4B:
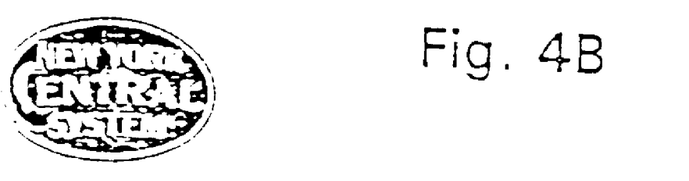
Figure 4C:
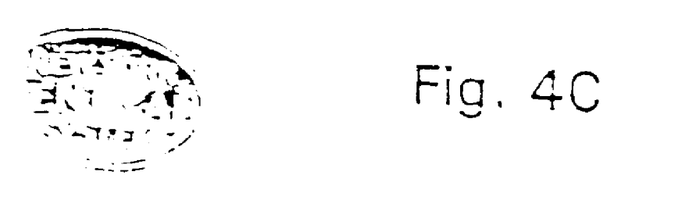
Figure 4D:
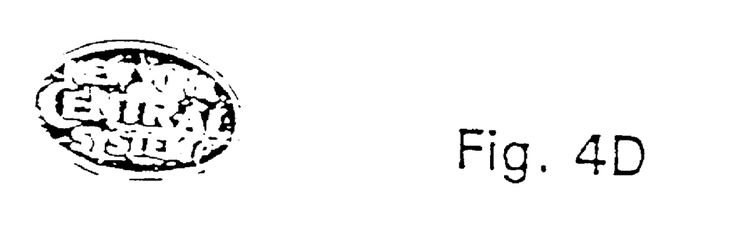

Durability according to the wet barrel durability test procedure is determined by firing a golf ball at 135 ft/sec (at 72° F.) into 5-sided steel pentagonal container, the walls of which are steel plates. The container 110, which is shown schematically in FIG. 2, has a 19½ inch long insert plate 112 mounted therein, the central portion 114 of which has horizontally extending square grooves on it which are intended to simulate a square grooved face of a golf club. The grooves, which are shown in an exaggerated form in FIG. 3, have a width 130 of 0.033 inches, a depth 132 of 0.100 inches, and are spaced apart from one another by land areas 134 having a width of 0.130 inches. The five walls 116 of the pentagonal container each have a length of 14½ inches. The inlet wall is vertical and the insert plate is mounted such that it inclines upward 60° relative to a horizontal plane away from opening 120 in container 110. The ball travels 15½–15¾ inches horizontally from its point of entry into the container 110 until it hits the square-grooved central portion 114 of insert plate 112. The angle between the line of trajectory of the ball and the insert plate 112 is 30°. The balls are subjected to 70 or more blows (firings) and are inspected at regular intervals for breakage (i.e., any signs of cover cracking or delamination). If a microcrack forms in a ball, its speed will change and the operator is alerted. The operator then visually inspects the ball. If the microcrack cannot yet be observed, the ball is returned to the test until a crack can be visually detected. The balls are then examined for adhesion of the ink.

Having generally described the invention, the following examples are included for purposes of illustration so that the invention may be more readily understood and are in no way intended to limit the scope of the invention unless otherwise specifically indicated.

EXAMPLE 1

A golf ball printing ink was prepared which contains:

5 parts by weight 1,6 hexane dioldiacrylate (sold by Sartomer, Exton, Pa. 19341), 17.5 parts by weight black pigment paste in diacrylate monomer, sold as Carbon Black UV Dispersion 99B415 (Penn Color, Doylestown, Pa.), 35 parts by weight of an aliphatic urethane acrylate oligomer (CN965, sold by Sartomer, Exton, Pa. 19341).

0.5 parts by weight isopropyl thioxanthone, $C_{16}H_{14}OS$, a sulfur-type photoinitiator (ITX, distributed by Aceto Chemical, Lake Success, N.Y.), 1 part by weight ethyl 4-dimethylamino benzoate, $C_{11}H_{15}NO_2$, an amine-type photoactivator (EDB, distributed by Aceto Chemical, Lake Success, N.Y.), 4.4 parts by weight xylene solvent, and 4.4 parts by butyl acetate solvent.

The photoinitiator and photoactivator were dissolved in the xylene/butyl acetate solvent blend. The ink was pad printed using a silicone pad on unprimed, dimpled ionomeric covers of several dozen golf balls. The ink had a viscosity of about 27,500 (centipoise) cps at the time of application. The balls containing the stamped indicia were passed through a Uvex UV treatment apparatus Lab Model #14201 at a rate of 10 feet/min, using a lamp intensity of 235 watt/in$^2$ and wavelength range of 200–400 nm with the indicia being located about 1¾ inches from the UV light source. The ink was cured in less than about 1 second and had a sward hardness of about 14 after curing was complete. The golf balls were then coated with a solvent borne polyurethane top coat formed from a polyester type hexamethylene diisocyanate. The adhesion of the indicia on the balls was tested for durability according to the wet barrel durability test procedure described above. After wet barrel durability testing, the balls were examined and it was found that no more than about 20% of the surface area of the original ink logo was removed.

EXAMPLE 2

The procedure of Example 1 was repeated with the exception that the ink formulation that was used contained:

10 parts by weight 1,6 hexane dioldiacrylate (sold by Sartomer), 35 parts by weight black pigment paste in diacrylate monomer, sold as Carbon Black UV Dispersion 99B415, 70 parts by weight of a difunctional aliphatic urethane acrylate oligomer (Ebecryl 4833 RadCure, Smyrna, Ga.), 1 part by weight isopropyl thioxanthone, $C_{16}H_{14}OS$ (ITX), and 2 parts by weight ethyl 4-dimethylamino benzoate (EDB). The ink had a viscosity of about 25,000 cps. The ink was cured in about 1 second and produced a film having a sward hardness of about 12. The balls were subjected to the wet barrel durability test procedure. After the wet barrel durability testing, it was found that no more than about 20% of the ink logo was removed.

EXAMPLE 3

The procedure of Example 1 was repeated with the exception that the CN965 oligomer was replaced by a difunctional oligomer sold as Ebecryl 8402 (Rad-Cure, Smyrna, Ga.). The ink had a viscosity of about 18,000 cps. The ink was cured in about 1 second and produced a film having a sward hardness of about 14. The ink was found to be nearly as durable as that of Examples 1 and 2.

EXAMPLE 4

The procedure of Example 1 was repeated with the exception that the ink formulation that was used contained:

7.3 parts by weight 1,6 hexane dioldiacrylate (sold by Sartomer, Exton, Pa. 19341), 19.2 parts by weight black pigment paste in diacrylate monomer, sold as ICU 386 (Industrial Color Ink, Joliette, Ill.), 21.0 parts by weight aliphatic polyether urethane oligomer (BR-571, Bomar Specialties Company, Winsted, Conn.), 0.5 parts by weight isopropyl thioxanthone, $C_{16}H_{14}OS$, a sulfur-type photoinitiator (ITX, distributed by Aceto Chemical, Lake Success, N.Y.), 1 part by weight ethyl 4-dimethylamino benzoate (EDB), 11.4 parts by weight talc (Vantalc 6H, Vanderbilt, Norwalk, Conn.), 22.9 parts by weight barium sulfate (106 Low-Micron White Barytles, Whittaker, Clark & Daniels, Inc., South Plainfield, N.J.), 12.1 parts by weigh butyl acetate solvent, and 4.6 parts by weight propylene glycol monomethyl ether acetate solvent.

The ink was applied directly to ionomeric covers of golf balls, and also over ionomeric covers to which a water borne polyurethane primer layer had been applied prior to application of the ink. The ink was cured in about 1 second and produced a film having a sward hardness of about 14. The balls were top coated and subjected to the wet barrel durability test procedure. After the wet barrel durability testing, it was found that no more than about 20% of the ink logo was removed.

Comparative Example 1

The procedure of Example 1 was repeated with the exception that a commercially available UV curable ink was used, namely Blk #700801 (Trans Tech, Carol Stream, Ill.). The ink had a viscosity of about 6,000 cps. The ink was cured in about 1 second and produced a film having a sward hardness of about 26. After the wet barrel durability test only the outline of the logo remained. Most of the ink in the dimples and on the land areas had been removed. Intercoat adhesion between the ink and top coat was poor.

Comparative Example 2

The procedure of Example 1 was repeated on several golf balls with the exception that a commercially available UV curable ink was used, namely L-526-163-B (Qure Tech, Seabrook, N.H.). The ink had a viscosity of about 28,500 cps. The ink was cured in about 1 second and produced a film having a sward hardness of about 20. As a result of the wet barrel durability test, the ink on at least about 60% of the surface area of the logo had been removed. It is believed that the ink was too brittle to withstand the conditions of the wet barrel durability test.

EXAMPLE 5

ATH-containing formulation 1, shown below, was prepared:

| ATH-Containing Formulation 1 | Parts by weight |
| --- | --- |
| Acrylic —OH functional resin[1] | 540.5 |
| Acetate and aromatic hydrocarbon solvent blend[2] | 189.2 |
| ATH[3] | 270.3 |
| | 1000.0 |

[1]McWorther Resin 975 (McWorther, Inc., Carpentersville, IL)
[2]Summit Ink Reducer, Summit PT #910527 (Summit Screen Inks, No. Kansas City, MO) Alternatively, a mixture based upon 43.4 parts by weight butyl acetate, 28.3 parts by weight xylene and 28.3 parts by weight propylene glycol monomethyl ether acetate can be used.
[3]ATH SpaceRite S-3 (ALCOA Industries, Bauxite, AR)

The ATH-containing formulation 1 was then used to form a golf ball ink which contained:

5 parts by weight aliphatic urethane triacrylate (BR-990, Bomar Specialties Co., Winsted, Conn.), 35 parts by weight ATH-containing formulation 1, 5.5 parts by weight trimethylolpropane triacrylate (TMPTA) (Sartomer Co., West Chester, Pa.)

5 parts by weight black dispersion in oligomer/monomers (ICU 386, Industrial Color Inc., Joliette, Ill.), 0.3 parts by weight isopropyl thioxanthone, $C_{16}H_{14}OS$, a sulfur-type photoinitiator (ITX, distributed by Aceto Chemical, Lake Success, N.Y.), 1 part by weight ethyl 4-dimethylamino benzoate, $C_{11}H_{15}NO_2$, an amine-type photoactivator (EDB, distributed by Aceto Chemical, Lake Success, N.Y.), and 10 parts by weight ATH (SpaceRite S-3, ALCOA Industries, Bauxite, Ariz.). All ingredients were mixed and dispersed on high speed mixing equipment.

The ink was pad printed using a silicone pad on unprimed, dimpled ionomeric covers of several dozen golf balls. The balls containing the stamped indicia were passed through a Uvex UV lamp at a rate of 10 feet/min., using a lamp intensity of 235 watt per inch$^2$ and a wavelength range of 200–400 nm with the indicia being located about 1¾ inches from the UV light source. The ink was cured in less than one second. The golf balls were then coated with a two component polyester/aliphatic polyisocyanate clear coat. The printability, jetness, detail image, pad release, and durability of the ink was evaluated and was compared with three sets of control inks, designated as Control A, Control B, and Control C. The formulations of the Control A and Control B inks are shown below:

| Control A | |
|---|---|
| | parts by wt. |
| Aliphatic urethane-acrylic oligomer[1] | 6.45 |
| Acrylic —OH functional resin[2] | 42.96 |
| Acetate and aromatic hydrocarbon solvent blend[3] | 8.85 |
| Talc[4] | 5.59 |
| Barium sulfate[5] | 12.89 |
| Black dispersion in oligomer/monomer[6] | 6.01 |
| TMPTA[7] | 15.18 |
| Isopropyl thioxanthone[8] | 0.69 |
| Ethyl 4-dimethylamino benzoate[9] | 1.38 |
| | 100.00 |

[1]BR-571 (Bomar Specialties Co., Winsted, CT)
[2]McWorther Resin 975 (McWorther, Inc., Carpentersville, IL)
[3]Summit Ink Reducer (Pt# 910527, Summit Screen Inks, No. Kansas City, MO)
[4]Van Talc #6H (Vanderbilt, Norwalk, CT)
[5]Barytes #22 (Whittaker, Clark & Daniels, Inc., South Plainfield, NJ)
[6]ICU 386 (Industrial Color Inc., Joliette, IL)
[7](Sartomer Co., West Chester, PA)
[8]ITX (distributed by Aceto Chemical, Lake Success, NY)
[9]EDB (distributed by Aceto Chemical, Lake Success, NY)

| Control B | |
|---|---|
| | parts by wt. |
| Epoxy-acrylate oligomer[1] | 19.24 |
| Acrylic —OH functional resin[2] | 27.70 |
| Acetate and aromatic hydrocarbon solvent blend[3] | 13.84 |
| Talc[4] | 7.69 |
| Barium sulfate[5] | 7.69 |
| Black dispersion in oligomer/monomer[6] | 6.15 |
| Polyester-acrylate oligomer[7] | 15.38 |
| Isopropyl thioxanthone[8] | 0.77 |
| Ethyl 4-dimethylamino benzoate[9] | 1.54 |
| | 100.00 |

[1]Ebecryl 3700 (Rad-Cure, Smyrna, GA)
[2]McWorther Resin 975 (McWorther, Inc., Carpentersville, IL)
[3]Summit Ink Reducer (Pt# 910527, Summit Screen Inks, No. Kansas City, MO)
[4]Van Talc 6H (Vanderbilt, Norwalk, CT)
[5]Barytes #22 (Whittaker, Clark & Daniels, Inc., South Plainfield, NJ)
[6]ICU 386 (Industrial Color Inc., Joliette, IL)
[7]Ebecryl 80 (Rad-Cure, Smyrna, GA)
[8]ITX (distributed by Aceto Chemical, Lake Success, NY)
[9]EDB (distributed by Aceto Chemical, Lake Success, NY)

Control C was Trans Tech ink #2P37-2 (Trans Tech, Carol Stream, Ill.). The ratings for the various ink formulations are shown below:

| Ink | Printability | Jetness | Detail Image | Pad Release | Durability |
|---|---|---|---|---|---|
| Example 5 | 1½ | 1 | 1 | 1½ | 1 |
| Control A | 2½ | 2½ | 2 | 2½ | 1 |
| Control B | 3 | 2½–3 | 2½ | 3 | 2½ |
| Control C | 1½–2 | 1 | 1 | 1½–2 | 2½ |

Ratings were from 1–5 with 1 being ideal and 5 being unacceptable. All of the balls of Example 5 and the balls of Controls A, B and C were covered with a one-coat top coating system of 160 mg, the top coating being a two component polyester/aliphatic polyisocyanate clear coat.

The ink of Example 5 had a oligomer/monomer content of 22.608%, an acrylic resin content of 21.508%, a black pigment content of 3.08 wt %, an ATH pigment content of 31.63 wt %, a solvent content of 20.008% and an initiator content of 1.62 wt %. The density of the ink was 10.68 lbs./gal., the total nonvolatiles content was 80%, and the volatile organic compounds constituted 2.14 lbs./gal. The viscosity of the ink was 11,000 centipoise at the time of application. After curing, the smudge resistance of the ink was tested using methyl ethyl ketone solvent. No smudging occurred.

It has been found that the solvent content of the ink can be significantly increased without reducing the quality of the identification stamp. For example, by further reducing the ink by 30% (by adding solvent), the viscosity of the ink will decrease to about 1420 centipoise. An ink with this low viscosity tends to have better printability than more viscous inks on certain pad printing machines.

FIG. 4 shows a silicone pad after 12 golf balls have been stamped with a particular type of ink. FIG. 4-A shows the stamp after stamping with the ink of Control A. FIG. 4-B shows the silicone pad after stamping with the ink of Control B. FIG. 4-C shows the pad after stamping with the ink of Example 5. FIG. 4-D shows the pad after stamping with Control C. As indicated by the resulting stamps, the best transfer, i.e. the least quantity of ink remaining on the stamp, resulted from the use of the ink of Example 5.

EXAMPLE 6

ATH-containing formulation 2, shown below, was prepared:

| ATH-Containing Formulation 2 | Parts by weight |
|---|---|
| Acrylic —OH functional resin[1] | 21.84 |
| Propylene glycol monomethyl ether acetate solvent[2] | 4.85 |
| ATH[3] | 20.70 |
| Talc[4] | 19.50 |
| Black dispersion in oligomer/monomer[5] | 9.50 |
| | 76.39 |

[1]McWorther Resin 975, (McWorther, Inc., Carpentersville, IL)
[2]Dow Chemical (and others)
[3]ATH SpaceRite S-3 (ALCOA Industries, Bauxite, AR)
[4]Van Talc #6H (Vanderbilt, Norwalk, CT)
[5]ICU 386 (Industrial Color Inc., Joliette, IL)

After the formulation was mixed, the following materials were added:

1.31 parts by weight butyl acetate, (Eastman Chemical and others), 6.16 parts by weight Aromatic 100 or HiSol 53, (Ashland Chemicals), 3.08 parts by weight cyclohexanone (Ashland Chemicals), 0.50 parts by weight isopropyl thioxanthone, $C_{16}H_{14}OS$, a sulfur-type photoinitiator (ITX, distributed by Aceto Chemical, Lake Success, N.Y.), 1 part by weight ethyl 4-dimethylamino benzoate, $C_{11}H_{15}NO_2$, an amine-type photoactivator (EDB, distributed by Aceto Chemical, Lake Success, N.Y.), 5.78 parts by weight aliphatic urethane triacrylate (UV curable resin) (BR-990, Bomar Specialties Co., Winsted, Conn.), and 5.78 parts by weight trimethylolpropane triacrylate (UV curable resin) (TMPTA) (Sartomer Co., West Chester, Pa.).

The total parts by weight were 100. All ingredients were mixed and dispersed using high speed mixing equipment.

The ink was pad printed using a silicone pad on unprimed, dimpled ionomeric covers of a large number of golf balls. The golf balls containing a stamped indicia were passed through a Uvex UV lamp at a rate of 10 feet per minute, using a lamp intensity of 235 watts per inch$^2$ and a wave length range of 200–400 nm with the indicia being located at about 1¾ inches from the UV light source. The ink was cured in less than one second. The golf balls were then coated with a two-component polyester/aliphatic polyisocyanate clear coat and were subjected to the wet barrel durability test procedure. After the wet barrel durability testing, it was found that no more than about 20% of the ink logo was removed.

EXAMPLE 7

The procedure of Example 6 was repeated with the exception that the quantity of ATH was reduced to 19.20 parts by weight, and the ATH-containing formulation (ATH-containing formulation 2) included only 0.22 parts by weight of black dispersion in oligomer/monomer[1], and further contained 8.16 parts of a first red dispersion in oligomer/monomer[2] and 2.62 parts of a second red dispersion in oligomer/monomer[3]. All ingredients were mixed and dispersed on high speed mixing equipment. The total parts by weight were 100.

[1]ICU 386 (Industrial Color Ink, Joliette, Ill.)
[2]ICU Red Lake C (Industrial Color Ink, Joliette, Ill.)
[3]ICU Lithol 388 Red (Industrial Color Ink, Joliette, Ill.)

The ink was pad printed using a silicone pad on unprimed, dimpled ionomeric covers of a number of golf balls. The golf balls containing a stamped indicia were passed through a Uvex UV lamp at a rate of 10 feet per minute, using a lamp intensity of 235 watts per inch$^2$ and a wave length range of 200–400 nm with the indicia being located about 1¾ inches from the UV light source. The ink was cured in less than one second. The golf balls were then coated with a two-component polyester/aliphatic polyisocyanate clear coat and were subjected to the wet barrel durability test procedure. After the wet barrel durability testing, it was found that no more than about 20% of the ink logo was removed.

EXAMPLE 8

ATH-containing formulation 3, shown below, was prepared:

| ATH-Containing Formulation 3 | Parts by weight |
|---|---|
| Acrylic —OH functional resin[1] | 30.78 |
| Butyl acetate solvent | 4.67 |
| Xylene solvent[2] | 3.04 |
| Propylene glycol monomethyl ether acetate solvent | 3.04 |
| ATH[3] | 31.66 |
| | 73.19 |

[1]McWorther Resin 975 (McWorther, Inc., Carpentersville, IL)
[2]Shell
[3]ATH SpaceRite S-3 (ALCOA Industries, Bauxite, AR)

After mixing, the following materials were added:

5.69 parts by weight red dispersion in oligomer/monomer (ICU Red Lake C, Industrial Color Ink, Joliette, Ill.), 1.92 parts by weight red dispersion in oligomer/monomer (ICU Lithol Rubine, Industrial Color Ink, Joliette, Ill.), 0.47 parts by weight black dispersion in oligomer/monomer (ICU 386, Industrial Color Ink, Joliette, Ill.), 0.49 parts by weight isopropyl thioxanthone, $C_{16}H_{14}OS$, a sulfur-type photoinitiator (ITX, distributed by Aceto Chemical, Lake Success, N.Y.), 1.14 parts by weight ethyl 4-dimethylamino benzoate, $C_{11}H_{14}NO_2$, an amine-type photoactivator (EDB, distributed by Aceto Chemical, Lake Success, N.Y.), 8.14 parts by weight aliphatic urethane triacrylate (BR-990), Bomar Specialties Co., Winsted, Conn.), and 8.95 parts by weight trimethylolpropane triacrylate (TMPTA) (Sartomer Co., West Chester, Pa.).

The total parts by weight were 99.99.

To provide for optimum printing, the viscosity of the ink was reduced to 1200 centipoise by adding 15 wt % (based upon the weight of the ink before reduction) of a solvent which was made by mixing 43.4 parts by weight butyl acetate, 28.3 parts by weight xylene and 28.3 parts by weight propylene glycol monomethyl ether acetate.

The ink was printed on a number of golf balls. The golf balls were then coated with a two-component polyester/aliphatic polyisocyanate clear coat and were subjected to the wet barrel durability test procedure. After the wet barrel durability testing, it was found that no more than about 20% of the ink logo was removed. The balls which were initially printed had a crisp image. After time, some ghosting appeared.

EXAMPLE 9

ATH-containing formulation 4, as shown below, was prepared:

| ATH-Containing Formulation 4 | Parts by Weight |
|---|---|
| Acrylic —OH functional resin[1] | 21.63 |
| Butyl Acetate | 7.57 |
| ATH[2] | 21.34 |
| Talc[3] | 19.35 |
| First red dispersion in oligomer/monomer[4] | 7.04 |
| Second red dispersion in oligomer/monomer[5] | 2.26 |
| Black dispersion in oligomer/monomer[6] | 0.61 |
| Xylene solvent | 3.80 |

[1]McWorther Resin 975 (McWorther, Inc., Carpentersville, IL)
[2]ATH SpaceRite S-3 (ALCOA Industries, Bauxite, AR)
[3]Van Talc #6H (Vanderbilt, Norwalk, CT)
[4]ICU Red Lake C, (Industrial Color Ink, Joliette, IL)
[5]ICU Lithol Rubine 388, (Industrial Color Ink, Joliette, IL)
[6]ICU 386 (Industrial Color Ink, Joliette, IL)

After mixing, the following materials were added:
3.80 parts by weight propylene glycol monomethyl ether acetate solvent,
0.38 parts by weight isopropyl thioxanthone, $C_{16}H_{14}OS$, a sulfur-type photoinitiator (ITX, distributed by Aceto Chemical, Lake Success, N.Y.),
0.86 parts by weight ethyl 4-dimethylamino benzoate, $C_{11}H_{14}NO_2$, an amino-type photoinitiator (EDB, distributed by Aceto Chemical, Lake Success, N.Y.),
5.69 parts by weight aliphatic urethane triacrylate (BR-990, Bomar Specialties Co., Winsted, Conn.), and
5.69 parts by weight trimethylolpropane triacrylate (TMPTA) (Sartomer Co., West Chester, Pa.).
Total parts by weight were 100.02.

The ink was printed on a number of golf balls. The image was very dark. A satisfactory image probably could have been obtained using a lower level of black dispersion. The golf balls were then coated with a two-component polyester/aliphatic polyisocyanate clear coat and were subjected to the wet barrel durability test procedure. After the wet barrel durability testing, it was found that no more than about 20% of the ink logo was removed.

As will be apparent to persons skilled in the art, various modifications and adaptations of the structure above described will become readily apparent without departure from the spirit and scope of the invention, the scope of which is defined in the appended claims.

What is claimed is:

1. A UV curable ink composition, comprising:
   A UV curable resin,
   from 20% to about 50% by weight aluminum trihydroxide, the amount of aluminum trihydroxide being appropriate to provide the ink composition with improved pad transfer;
   a coloring agent, and
   a photoinitiator for initiating polymerization of the UV curable resin, the ink composition forming cured indicia having adhesive properties and impact resistance which render the cured indicia suitable for use on a game ball to be used in competitive play.

2. A UV curable ink composition according to claim 1, further comprising a thinning agent.

3. A UV curable ink composition according to claim 1, wherein the thinning agent includes at least one member selected from the group consisting of a monomer and a solvent.

4. A UV curable ink composition according to claim 1, wherein the UV curable resin comprises 10–90 wt % oligomer.

5. A UV curable ink composition according to claim 1, wherein the ink composition has a viscosity of about 1,000–28,000 centipoise.

6. A UV curable ink composition according to claim 1, wherein the ink composition contains 2–60 wt % coloring agent and 1–5 wt % photoinitiator.

7. A UV curable ink composition according to claim 1, wherein the ink composition further includes a non UV curable resin.

8. A UV curable ink composition, comprising:
   A UV curable resin,
   from 20% to about 50% by weight aluminum trihydroxide, the amount of aluminum trihydroxide being appropriate to provide the ink composition with improved pad transfer;
   a non-white coloring agent, and
   a photoinitiator for initiating polymerization of the UV curable resin, the ink composition forming cured indicia having adhesive properties, impact resistance, and visible coloring which render the cured indicia suitable for use on a game ball to be used in competitive play.

9. A UV curable ink composition according to claim 8, wherein said non-white coloring agent is selected from the group consisting of a black coloring agent, a red coloring agent, and mixtures thereof.

10. A UV curable ink composition, comprising:
    A UV curable resin,
    from 20% to about 50% by weight aluminum trihydroxide, the amount of aluminum trihydroxide being appropriate to provide the ink composition with improved pad transfer;
    a coloring agent, and
    a photoinitiator for initiating polymerization of the UV curable resin, the ink composition forming cured indicia having adhesive properties, impact resistance, and visible coloring which render the cured indicia suitable for use on a golf ball to be used in competitive play.

11. A UV curable ink composition according to claim 10, wherein said coloring agent is selected from the group consisting of a black coloring agent, a red coloring agent, and mixtures thereof.

12. A UV curable ink composition, comprising:
    A UV curable resin,
    from 24% to about 50% by weight aluminum trihydroxide, the amount of aluminum trihydroxide being appropriate to provide the ink composition with improved pad transfer;
    a coloring agent, and
    a photoinitiator for initiating polymerization of the UV curable resin, the ink composition forming cured indicia having adhesive properties and impact resistance which render the cured indicia suitable for use on a game ball to be used in competitive play.

13. A UV curable ink composition, comprising:
    A UV curable resin,
    from 24% to about 50% by weight aluminum trihydroxide, the amount of aluminum trihydroxide being appropriate to provide the ink composition with improved pad transfer;
    a non-white coloring agent, and
    a photoinitiator for initiating polymerization of the UV curable resin, the ink composition forming cured indicia having adhesive properties, impact resistance, and visible coloring which render the cured indicia suitable for use on a game ball to be used in competitive play.

14. A UV curable ink composition, comprising:

A UV curable resin, from 24% to about 50% by weight aluminum trihydroxide, the amount of aluminum trihydroxide being appropriate to provide the ink composition with improved pad transfer;

a coloring agent, and a photoinitiator for initiating polymerization of the UV curable resin, the ink composition forming cured indicia having adhesive properties, impact resistance, and visible coloring which render the cured indicia suitable for use on a golf ball to be used in competitive play.

* * * * *

UNITED STATES PATENT AND TRADEMARK OFFICE
CERTIFICATE OF CORRECTION

PATENT NO. : 6,191,185 B1
DATED : February 20, 2001
INVENTOR(S) : Viktor Keller It is certified that error appears in the above-identified patent and that said Letters Patent is hereby corrected as shown below:

Title page,
Item [63], Related U.S. Application Data, "which is a continuation-in-part of application No. 08/753,704, filed on Nov. 27, 1996, now Pat. No. 5,827,134." should read -- and a continuation-in-part of application No. 08/753,704, filed on Nov. 27, 1996, now Pat. No. 5,827,134. --

Signed and Sealed this

Fifteenth Day of April, 2003

JAMES E. ROGAN
*Director of the United States Patent and Trademark Office*